United States Patent
Alasirniö et al.

(10) Patent No.: US 10,459,187 B2
(45) Date of Patent: Oct. 29, 2019

(54) OPTICAL ASSEMBLY INCLUDING PASSIVE OPTICAL ELEMENTS HAVING ALIGNMENT FEATURES

(71) Applicant: ams Sensors Singapore Pte. Ltd., Singapore (SG)

(72) Inventors: Jukka Alasirniö, Jääli (FI); Tobias Senn, Zürich (CH); Markus Rossi, Jona (CH); Hartmut Rudmann, Jona (CH); Ohad Meitav, Sunnyvale, CA (US); Moshe Doron, San Francisco, CA (US); Kai Engelhardt, Buckenhof (DE)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 799 days.

(21) Appl. No.: 14/970,795

(22) Filed: Dec. 16, 2015

(65) Prior Publication Data
US 2016/0170166 A1   Jun. 16, 2016

Related U.S. Application Data

(60) Provisional application No. 62/092,358, filed on Dec. 16, 2014.

(51) Int. Cl.
  *G02B 7/02* (2006.01)
  *G02B 7/00* (2006.01)
(52) U.S. Cl.
  CPC ............ *G02B 7/003* (2013.01); *G02B 7/021* (2013.01); *G02B 7/022* (2013.01)

(58) Field of Classification Search
  CPC .......... G02B 7/003; G02B 7/021; G02B 7/022
  USPC .................... 359/503, 811, 819, 830
  See application file for complete search history.

(56) References Cited

U.S. PATENT DOCUMENTS

| | | | | |
|---|---|---|---|---|
| 4,662,717 A | * | 5/1987 | Yamada | G02B 7/022 359/362 |
| 7,068,448 B2 | * | 6/2006 | Huang | G02B 3/00 359/694 |
| 10,101,555 B2 | * | 10/2018 | Alasirnio | G03B 17/02 |
| 2002/0030899 A1 | * | 3/2002 | Maeda | G02B 7/021 359/811 |
| 2002/0114085 A1 | * | 8/2002 | Hattori | G11B 7/1376 359/811 |
| 2009/0015945 A1 | * | 1/2009 | Chen | G02B 7/021 359/819 |

FOREIGN PATENT DOCUMENTS

WO   WO 2015/009237   1/2015
WO   WO 2015/119571   8/2015

* cited by examiner

*Primary Examiner* — Darryl J Collins
(74) *Attorney, Agent, or Firm* — Michael Best & Friedrich LLP

(57) ABSTRACT

Optical assemblies include a stack of optical elements each of which has one or more alignment features. Each alignment feature traces a respective curve along a surface of one of the optical elements. The alignment feature(s) of one optical element fit within the alignment feature(s) of the other. In some cases, the alignment features can help establish more precise lateral alignment of the optical elements.

15 Claims, 7 Drawing Sheets

OPTICAL ASSEMBLY INCLUDING PASSIVE OPTICAL ELEMENTS HAVING ALIGNMENT FEATURES

CROSS-REFERENCE TO RELATED APPLICATION(S)

The present application claims the benefit of U.S. Provisional Patent Application No. 62/092,358, filed on Dec. 16, 2014, the contents of which are incorporated by reference herein in their entirety.

FIELD OF THE DISCLOSURE

This disclosure relates to optical assemblies including passive optical elements having alignment features.

BACKGROUND

Optical imaging devices, such as multi-channel or array cameras, sometimes employ lenses stacked along the device's optical axis in order to achieve desired optical performance. For example, in some cases, the device includes multiple imaging channels, each of which includes a stack of lenses. The lens elements may be comprised of optically active and optically inactive areas. The optically active area performs the optical function, whereas the optically inactive area may contain alignment features that facilitate alignment in the lateral (x, y) and height (z) directions with respect to other lens elements in the stack. Further, the optically inactive area may facilitate alignment with respect to a lens barrel. Nevertheless, tolerances in the dimensions of both the lens and barrel, as well as tolerances in the dimensions of the lens alignment features can prevent precise lateral alignment in the x and y directions.

SUMMARY

This disclosure describes optical assemblies including optical elements having alignment features. The alignment features can, in some cases, help establish more precise lateral alignment of the optical elements.

For example, in one aspect, an optical assembly includes a stack of optical elements. A first one of the optical elements has a first alignment feature tracing a curve along a surface of the first optical element, and a second one of the optical elements has a second alignment feature tracing a curve along a surface of the second optical element. The first alignment feature fits within the second alignment feature.

Some implementations include one or more of the following features. For example, each of the first and second alignment features can be annular shaped and, in some cases, are arc-shaped. The second alignment feature can be, for example, a track in the surface of the second optical element, and the first alignment feature can be, for example, a projection on the surface of the first optical element.

In some instances, each of the first and second optical elements has a respective optically active region and an optically inactive region. The first alignment feature can be, for example, in the optically inactive region of the first optical element, and the second alignment feature can be, for example, in the optically inactive region of the second optical element.

In some implementations, the first optical element has a first pair of flat side edges opposite one another and a second pair of rounded side edges opposite one another. The first alignment feature can be, for example, in an optically inactive region of the first optical element near one of the rounded side edges. Likewise, the second optical element has a first pair of flat side edges opposite one another and a second pair of rounded side edges opposite one another. The second alignment feature can be, for example, in an optically inactive region of the second optical element near one of the rounded side edges.

The optical assembly further can include a housing laterally surrounding the stack of optical elements. The housing can have an inner surface shaped to match respective shapes of the optical elements.

In some cases, the first optical element has a third alignment feature tracing an arc along the surface of the first optical element, and the second optical element has a fourth tracing an arc along the surface of the second optical element. The third alignment feature fits within the fourth alignment feature.

Each of the first and second optical elements can be, for example, a lens element or other passive optical element.

According to another aspect, an optical assembly includes a stack of optical elements. A first one of the optical elements has a multitude of discrete projections arranged along an arc on a surface of the first optical element. A second one of the optical elements has a track arranged along an arc in a surface of the second optical element. The projections of the first optical element fit within the track of the second optical element.

The projections can be, for example, in an optically inactive region of the first optical element, and the track can be in an optically inactive region of the second optical element.

According to yet another aspect, an optical assembly includes a stack of optical elements. A first one of the optical elements has a multitude of discrete projections arranged along an arc on a surface of the first optical element, and a second one of the optical elements has a multitude of indentations arranged along an arc in a surface of the second optical element. The projections of the first optical element fit within the indentations of the second optical element.

The projections can be, for example, in the optically inactive region of the first optical element, and the indentations can be, for example, in the optically inactive region of the second optical element.

The disclosure also describes an optical imaging device including an image sensor and an optical assembly disposed over the image sensor.

Various advantages are present in some implementations. For example, in addition to precise lateral alignment of the optical elements, the footprint of the optical assembly can be made relatively small. This can be particularly advantageous for small electronic devices, such as smart phones and other compact consumer devices in which space is at a premium.

Other aspects, features and advantages will be apparent from the following detailed description, the accompanying drawings, and the claims.

DETAILED DESCRIPTION

The present disclosure describes optical assemblies including a stack of two or more passive optical elements in which a first one the optical elements in the stack includes a curved track, and an adjacent one of the optical elements in the stack includes a curved projection. To facilitate proper alignment of the first and second optical element, the curved projection of the second optical elements fits within the curved track of the first optical element. Thus, the shapes of the curved track and projection substantially match one another. The shape of the curved track and projection may be, for example, annular (i.e., a circular ring), and in some cases are shaped as an arc of circle (i.e., a portion of a ring).

Figure 1A:
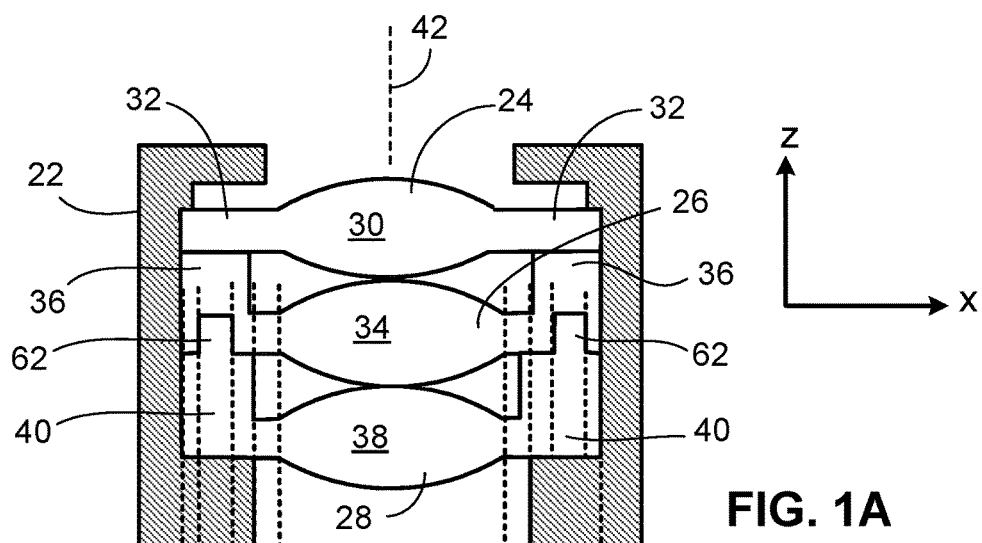
FIG. 1A is a cross-sectional side view of an optical assembly including a lens stack.

FIG. 1A shows an example of an optical assembly 20 including a housing such as a lens barrel 22 that holds a stack of passive optical elements 24, 26, 28 for an optical channel. In the illustrated example, the passive optical elements 24, 26, 28 are lens elements (e.g., diffractive or refractive lens elements). Although the illustrated example shows three lens elements, in some implementations, there may be as few as two optical elements in the stack, and in some instances there may be more than three passive optical elements in the stack. Further, although the illustrated example includes hybrid-shaped lens elements as the passive optical elements, in some cases, the passive optical elements may be microlens arrays or other types of lens elements (e.g., photochromatic lenses, as well as other types of transformable or dynamic lenses).

Each lens element can include an optically active region and an optically inactive region. For example, the top lens element 24 has an optically active region 30 laterally surrounded by an optically inactive region 32. Likewise, the middle lens element 26 has an optically active region 34 laterally surrounded by an optically inactive region 36. Similarly, the base or bottom lens element 28 has an optically active region 38 laterally surrounded by an optically inactive region 40.

Figure 1B:
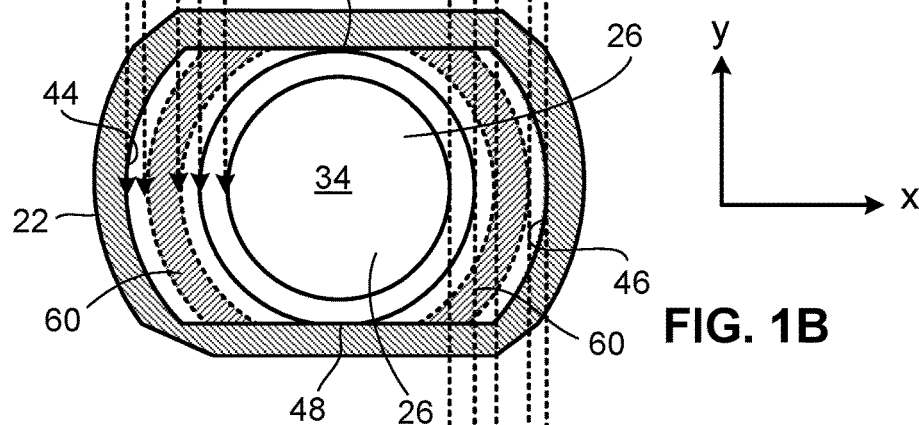
FIG. 1B is a bottom view of the middle lens element in the optical assembly of FIG. 1A.
Figure 1C:
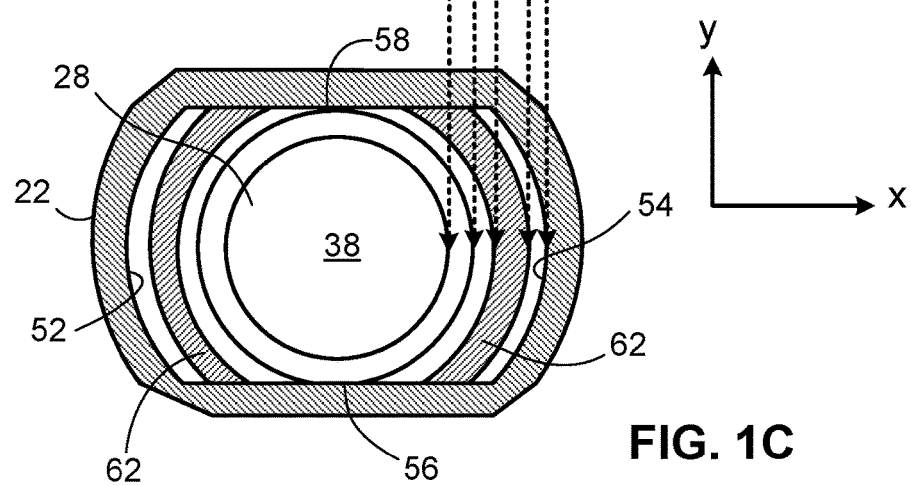
FIG. 1C is a top view of the base lens element in the optical assembly of FIG. 1A.

When viewed along the central optical axis 42, each of the lens elements 24, 26, 28 can have a circular shape. In other cases, at least one of the lens elements 24, 26, 28 has one or more substantially flat side edges. For example, in some instances, one or more of the lens elements has a first pair of opposite side edges that are rounded (e.g., shaped as arcs of a circle) and a second pair of opposite side edges that are substantially flat. Thus, as shown in FIG. 1B, the middle lens element 26 has a pair of opposite side edges 44, 46 that are rounded in the shape of arcs, and a pair of opposite side edges 48, 50 that are substantially flat. Similarly, as shown in FIG. 1C, the base lens element 28 has a pair of opposite side edges 52, 54 that are rounded in the shape of arcs, and a pair of opposite side edges 56, 58 that are substantially flat. The top lens element 24 also can be shaped in a similar manner (see FIG. 2).

One advantage of providing lens elements having at least one or more flat sides is that the optically inactive area can be cut or formed with flat sides so that the footprint of the lens element is reduced. Such an arrangement can allow multiple lens elements with flat sides to be placed in relatively close proximity to one another, for example, in an array (see, e.g., FIGS. 2 and 3A-3D). On the other hand, the rounded sides of the lens elements can be used to facilitate alignment with the lens barrel 22, which has openings to accommodate the lens elements. The openings in the lens barrel 22 for receiving the lens elements 24, 26, 28 should be shaped to match the corresponding lens element. Thus, if the lens element has two flat side edges and two rounded side edges, the corresponding opening in the lens barrel 22 also should have two flat sides and two rounded sides sized to allow the lens element to fit in the opening with only very little tolerance.

Figure 1D:
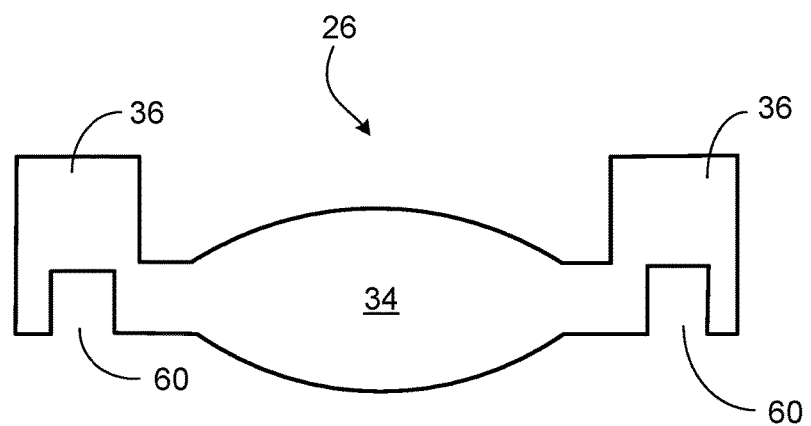
FIG. 1D is a cross-sectional side view of the middle lens element in the optical assembly of FIG. 1A.
Figure 1E:
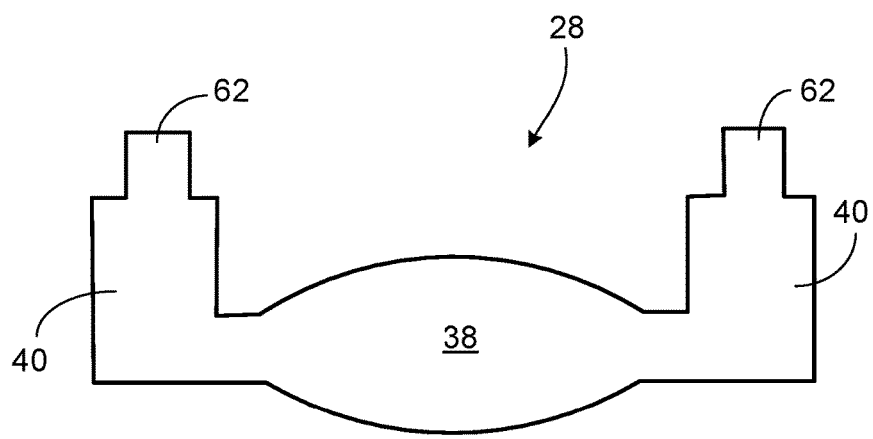
FIG. 1E is a cross-sectional side view of the base lens element in the optical assembly of FIG. 1A.

Regardless of whether the lens elements are circular or have one or more flat side edges, at least some of the lens elements include an alignment feature, for example, in the rounded portion of their inactive region. As indicated by the example of FIGS. 1A, 1B and 1D, the middle lens element 26 has curved tracks 60 in the form of arcs that serve as alignment features. Each track 60 can be a trench or indentation in the inactive region 36 of the lens element 26. In some cases, the track 60 is over the main surface of the lens element 26. Similarly, as indicated by FIGS. 1A, 1C and 1E, the adjacent bottom lens element 28 has curved projections 62 in the form of arcs that serve as alignment features. Each projection 62 projects outward from the inactive region 40 of the lens element 28. When the lens elements 26 and 28 are properly aligned with one another, the projections 62 of the bottom lens element 28 fit within and engage the respective tracks 60 of the lens element 26. The curved nature of the tracks 60 and corresponding projections 62 can help improve the alignment.

Figure 4A:
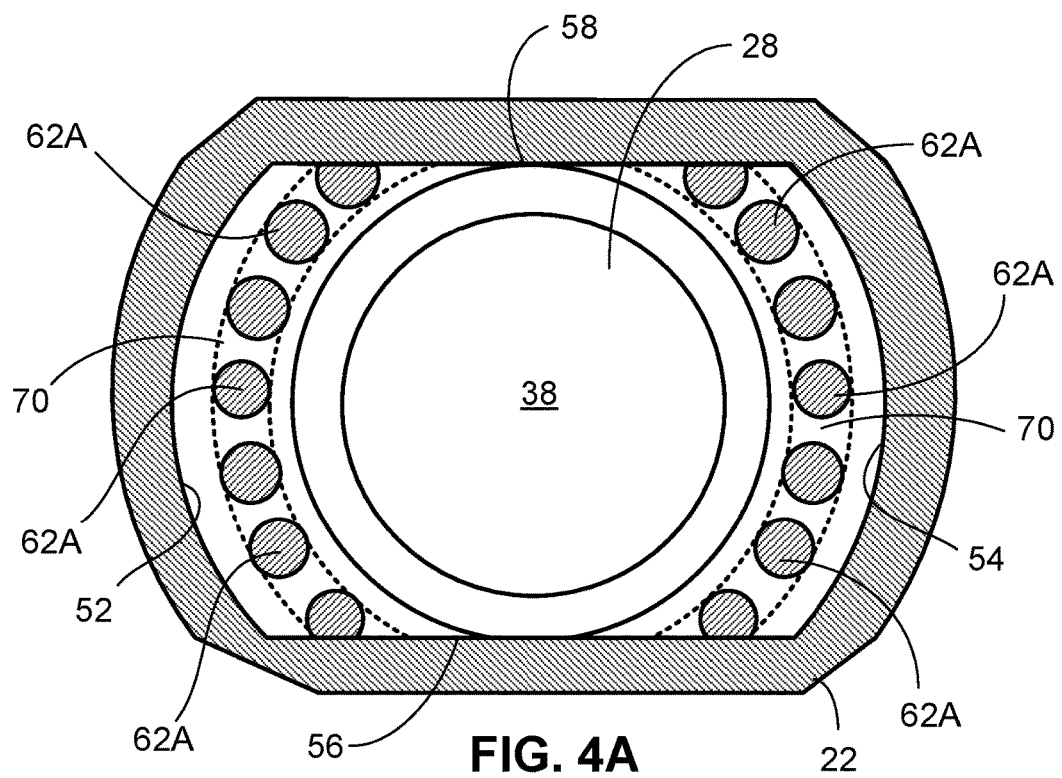
FIGS. 4A and 4B illustrate further examples of lens elements having alignment features.
Figure 4B:
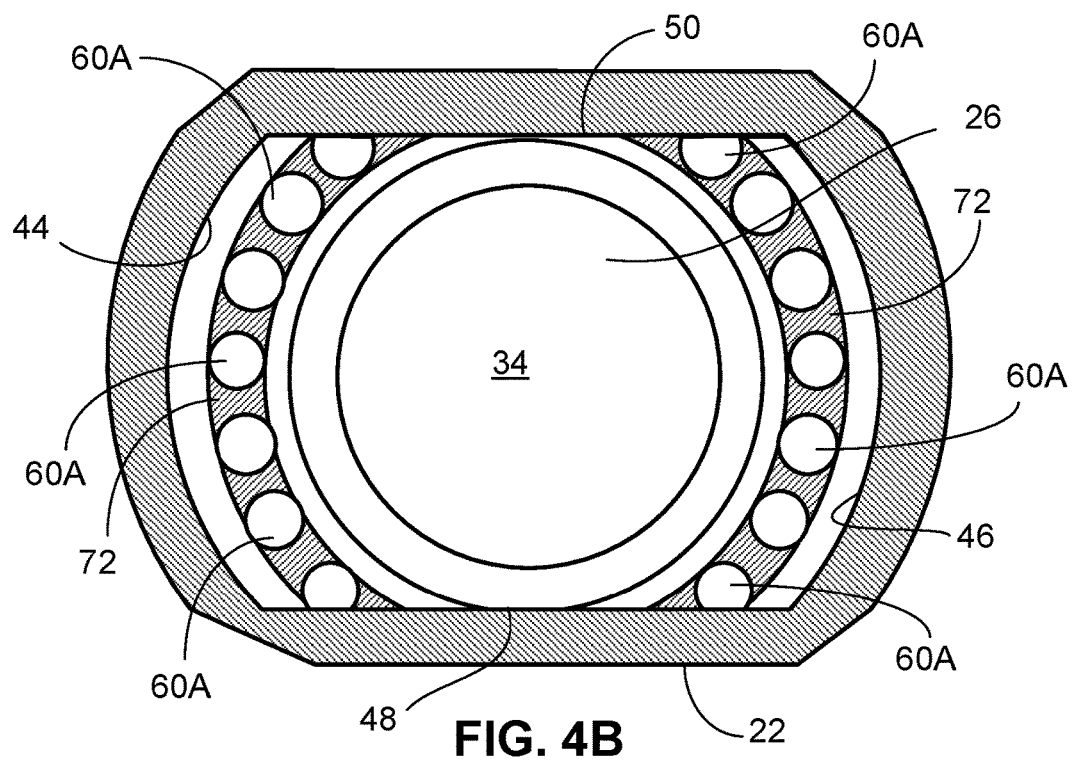

In the illustrated examples, the curved track 60 is a continuous trench or indentation in the inactive region of a lens element, and the curved projection 62 is a continuous extension from the inactive region of a lens element. However, in some cases, as shown in FIG. 4A, instead of a single continuous curved projection 62, the alignment feature can be implemented as multiple discrete projections 62A arranged along a curve 70 (e.g., an arc of a circle). The pattern of discrete projections 62A on the surface of one lens element should be arranged so they fit within and engage the track 60 of the adjacent lens element. Further, in some instances, as shown in FIG. 4B, instead of a single continuous curved track 60, the alignment feature can be implemented as multiple discrete indentations 60A arranged along a curve 72 (e.g., an arc of a circle). The pattern of discrete projections 62A on the surface of one lens element should be arranged to match the pattern of discrete indentations 60A in the surface of the adjacent lens element such that each discrete projection 62A fits within and engages a corresponding discrete indentation 60A.

Figure 2:
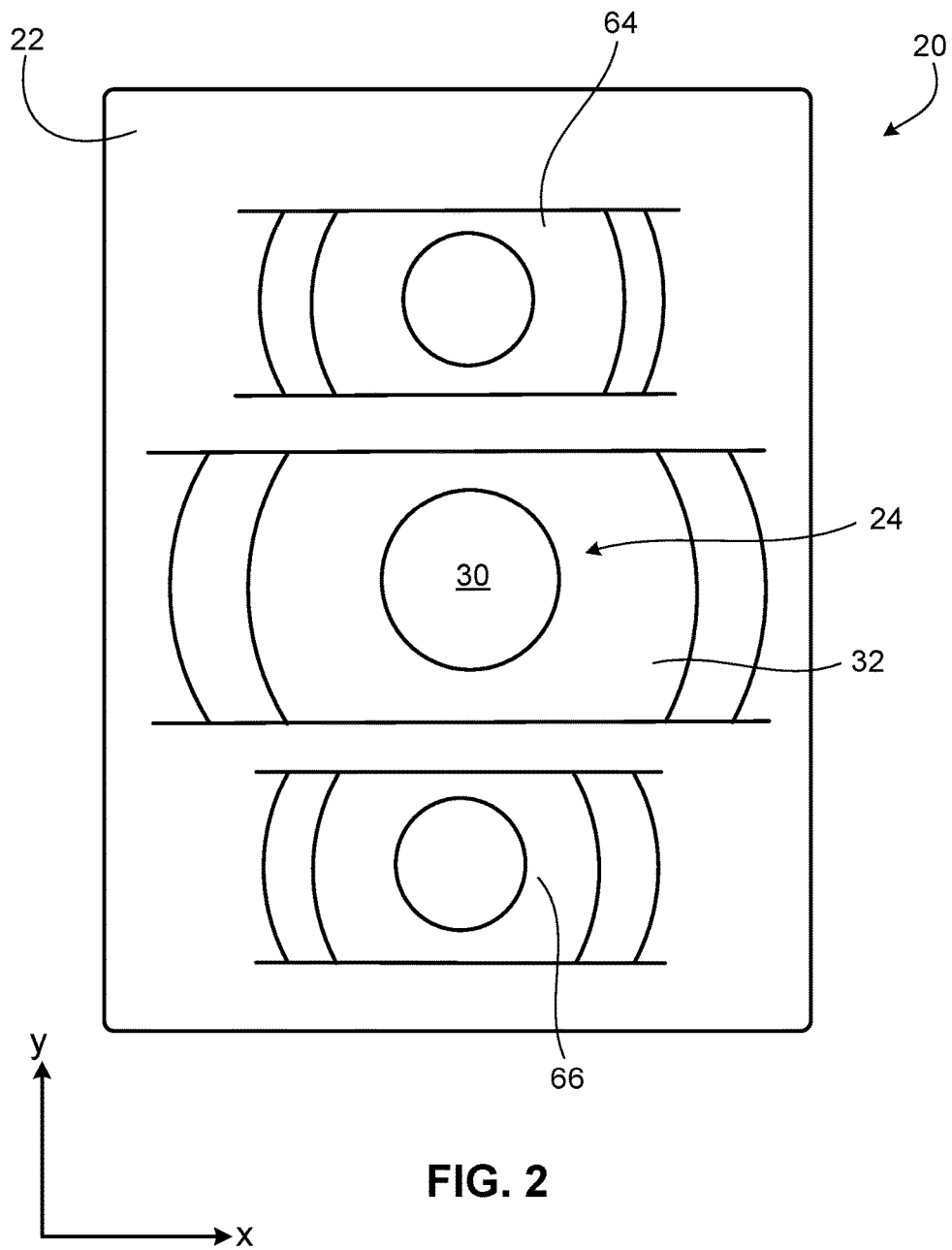
FIG. 2 is a top view of an example of an optical assembly including a lens stack array.
Figure 3A:
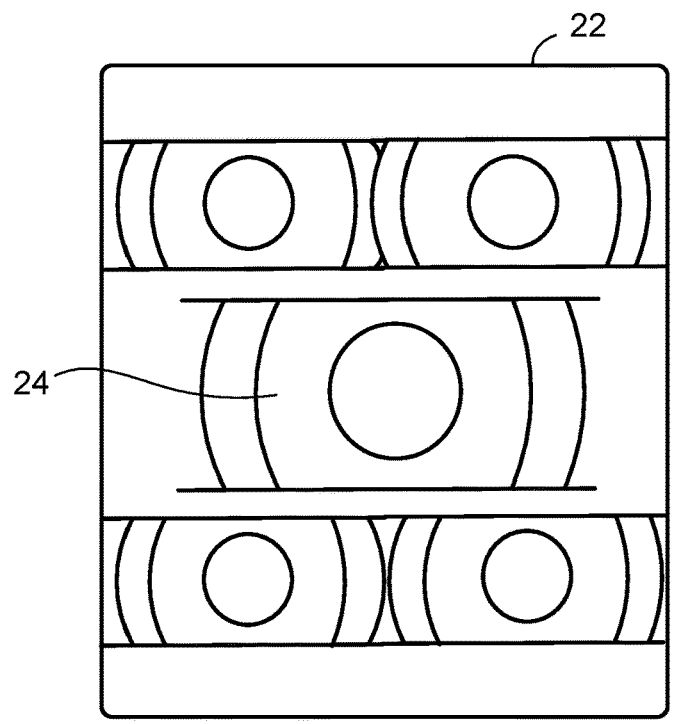
FIGS. 3A-3D are top views of further examples of optical assemblies including a lens stack array.
Figure 3B:
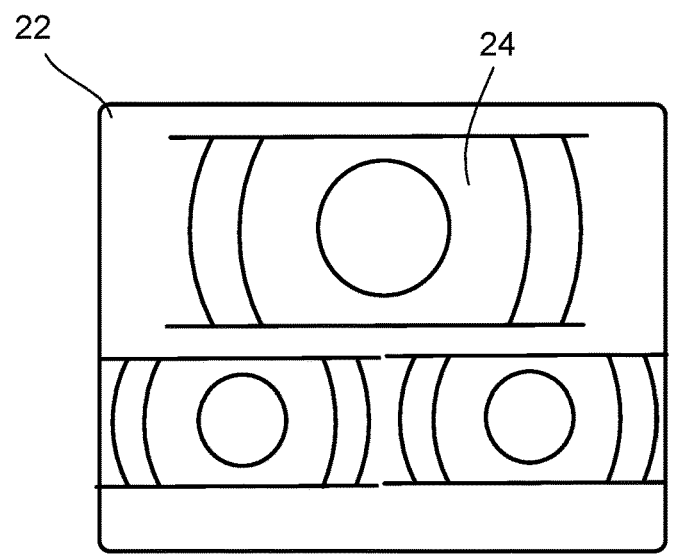
Figure 3C:
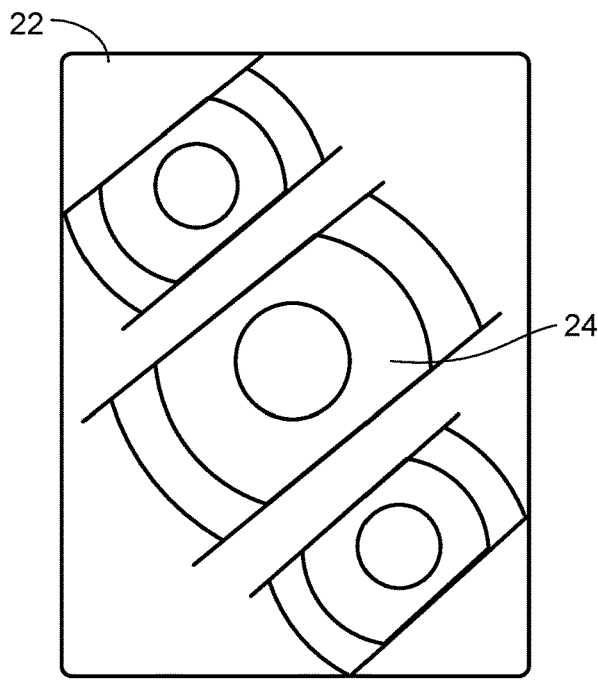
Figure 3D:
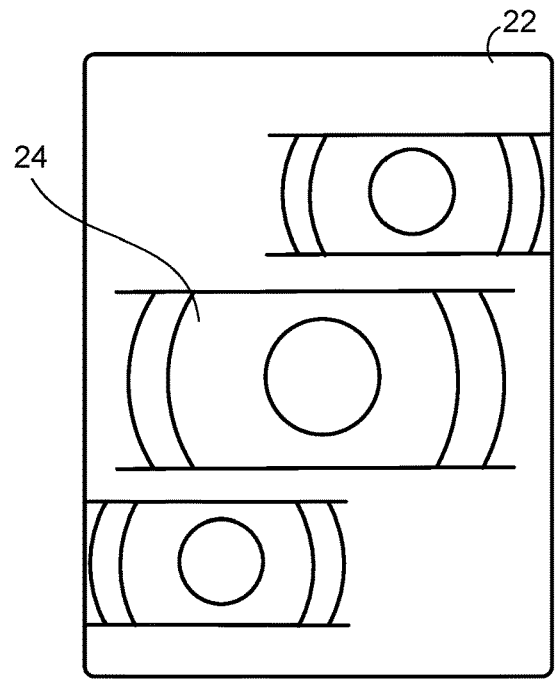

As mentioned above, the lens barrel 22 or other housing can hold multiple stacks of passive optical elements side-by-side to form arrays that correspond to different optical channels. For example, in some images, it can be useful to have an RGB channel for detecting light in the visible range, and two channels for detecting infra-red (IR) radiation. An example is illustrated in FIG. 2, which shows a top view of the assembly 20 in which the lens element 24 forms the top of the center lens stack, and lens elements 64, 66 respectively form the top of the two lens stacks on either side. Each stack can include two or more lenses having alignment features as described above. FIGS. 3A through 3D illustrate top views of additional arrangements having arrays of passive optical elements stacked on atop another. Other arrangements can be implemented as well.

As described above, in the example of FIG. 1A, the middle lens element 26 includes alignment features implemented as curved tracks 60 and the bottom lens element 28 includes alignment features implemented as curved projections 62. However, the alignment features can be reversed, such that the middle lens element 26 includes alignment features implemented as one or more curved projections and the bottom lens element 28 includes alignment features implemented as one or more curved tracks. Further, the alignment features 60, 62 can be provided, respectively, to any pair of adjacent optical elements in a particular stack (e.g., the top and middle lens elements 24, 26).

In some cases, a particular optical element can include at least one alignment feature on each of its opposite surfaces. For example, a first surface of a particular optical element (e.g., lens element 26) can have a first alignment feature, and a second surface of the same lens element can include a second alignment feature. This can facilitate alignment of the particular optical element with adjacent optical elements above and below. The first and second alignment features on opposite surfaces of the optical element can be of the same type or may be of different types. Thus, both surfaces of a particular optical element may have tracks (or projections), or one surface may have a track and another surface may have a projection.

The optical elements 24, 26, 28 can be manufactured, for example, by injection molding. In some cases, the optical elements (e.g., lenses) can be injection molded to have two flat side edges and two rounded side edges. In other cases, the optical elements (e.g., lenses) can be made by first manufacturing round lens elements, and subsequently cutting, machining or dicing the optically inactive region to form the flat side edges.

Figure 5:
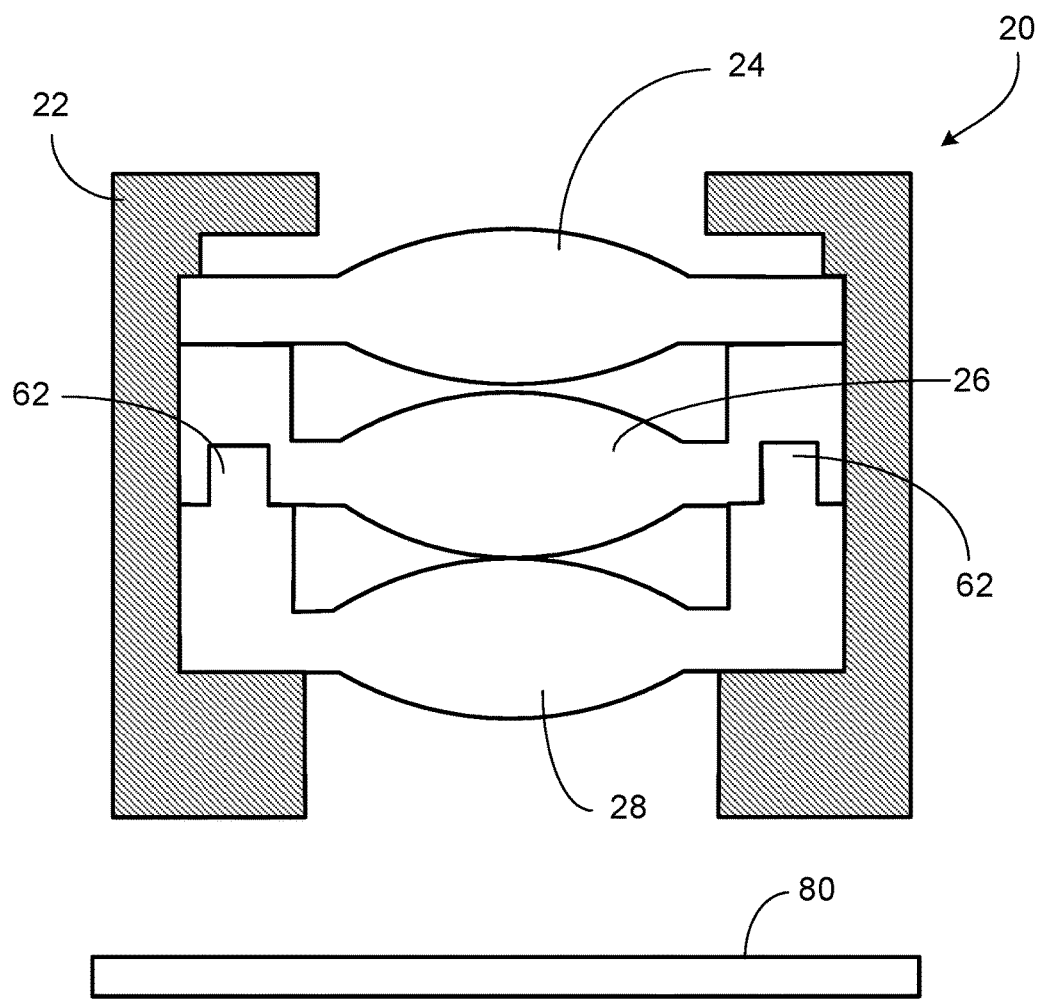
FIG. 5 illustrates an example of an optical imaging device.

Any of the foregoing implementations of the optical assembly 20 can be integrated, for example, into an optical imaging device. For example, as shown in FIG. 5, the optical assembly 20 is disposed over an image sensor 80 that includes pixels operable to generate signals in response to sensing received light. The image sensor can be, for example, a CCD (charge-coupled device) image sensor or a CMOS (complementary metal-oxide-semiconductor) sensor. Although the example of FIG. 5 shows an imaging device having only a single optical channel, as indicated above, the optical assembly 20 can be part of a multi-channel assembly, which can be disposed over one or more image sensors to form a multi-channel imaging device. The optical imaging devices can be used, for example, as compact digital cameras that can be integrated into various types of consumer electronics and other devices such as mobile phones, smart phones, personal digital assistants (PDAs) and laptops.

Various modifications can be made within the spirit of the present disclosure, and various features described in connection with different implementations can be combined together in a single embodiment. Accordingly, other implementations are within the scope of the claims.

What is claimed is:

1. An optical assembly comprising:
a stack of optical elements, wherein a first one of the optical elements has a first alignment feature tracing a curve along a surface of the first optical element, and a second one of the optical elements has a second alignment feature tracing a curve along a surface of the second optical element, wherein the first alignment feature fits within the second alignment feature, and wherein each of the first optical element and the second optical element has a shape that includes a respective first pair of flat side edges opposite one another and a respective second pair of rounded side edges opposite one another;
the optical assembly further including a housing laterally surrounding the stack of optical elements, wherein the housing has an inner surface shaped to match the shape of the optical elements.

2. The optical assembly of claim 1 wherein each of the first and second alignment features is annular shaped.

3. The optical assembly of claim 1 wherein each of the first and second alignment features is arc-shaped.

4. The optical assembly of claim 1 wherein the second alignment feature is a track in the surface of the second optical element.

5. The optical assembly of claim 1 wherein the first alignment feature is a projection on the surface of the first optical element.

6. The optical assembly of claim 1 wherein each of the first and second optical elements has a respective optically active region and an optically inactive region, and
wherein the first alignment feature is in the optically inactive region of the first optical element, and the second alignment feature is in the optically inactive region of the second optical element.

7. The optical assembly of claim 1
wherein the first alignment feature is in an optically inactive region of the first optical element near one of the rounded side edges of the first optical element.

8. The optical assembly of claim 1
wherein the second alignment feature is in an optically inactive region of the second optical element near one of the rounded side edges of the second optical element.

9. The optical assembly of claim 1 wherein the first optical element has a third alignment feature tracing an arc along the surface of the first optical element, and the second optical element has a fourth alignment feature tracing an arc along the surface of the second optical element, wherein the third alignment feature fits within the fourth alignment feature.

10. The optical assembly of claim 1 wherein each of the first and second optical elements is a lens element.

11. An optical imaging device comprising:
an image sensor; and
an optical assembly in accordance with claim 1 disposed over the image sensor.

12. An optical assembly comprising:
a stack of optical elements, wherein a first one of the optical elements has a plurality of discrete projections arranged along an arc on a surface of the first optical element, and a second one of the optical elements has a track arranged along an arc in a surface of the second optical element, wherein the projections of the first optical element fit within the track of the second optical element, and
wherein each of the first optical element and the second optical element has a shape that includes a respective first pair of flat side edges opposite one another and a respective second pair of rounded side edges opposite one another, and
wherein the optical assembly further includes a housing laterally surrounding the stack of optical elements, wherein the housing has an inner surface shaped to match the shape of the optical elements.

13. The optical assembly of claim 12 wherein each of the first and second optical elements has a respective optically active region and an optically inactive region, and wherein the projections are in the optically inactive region of the first optical element, and the track is in the optically inactive region of the second optical element.

14. An optical assembly comprising:
a stack of optical elements, wherein a first one of the optical elements has a plurality of discrete projections arranged along an arc on a surface of the first optical element, and a second one of the optical elements has a plurality of indentations arranged along an arc in a surface of the second optical element,
wherein the projections of the first optical element fit within the indentations of the second optical element, and
wherein each of the first optical element and the second optical element has a shape that includes a respective first pair of flat side edges opposite one another and a respective second pair of rounded side edges opposite one another, and
wherein the optical assembly further includes a housing laterally surrounding the stack of optical elements, wherein the housing has an inner surface shaped to match the shape of the optical elements.

15. The optical assembly of claim 14 wherein each of the first and second optical elements has a respective optically active region and an optically inactive region, and wherein the projections are in the optically inactive region of the first optical element, and the indentations are in the optically inactive region of the second optical element.

\* \* \* \* \*